US009096265B2

(12) United States Patent
Carr

(10) Patent No.: US 9,096,265 B2
(45) Date of Patent: Aug. 4, 2015

(54) STEERABLE TRAILER CHASSIS

(71) Applicant: Kevin Stuart Carr, Richmond, VA (US)

(72) Inventor: Kevin Stuart Carr, Richmond, VA (US)

( * ) Notice: Subject to any disclaimer, the term of this patent is extended or adjusted under 35 U.S.C. 154(b) by 0 days.

(21) Appl. No.: 13/843,966

(22) Filed: Mar. 15, 2013

(65) Prior Publication Data
US 2014/0265243 A1 Sep. 18, 2014

(51) Int. Cl.
*B62D 13/00* (2006.01)
*B62D 13/02* (2006.01)
*B62D 13/06* (2006.01)

(52) U.S. Cl.
CPC .............. *B62D 13/02* (2013.01); *B62D 13/06* (2013.01); *B62D 13/005* (2013.01)

(58) Field of Classification Search
CPC ............ B62D 7/08; B62D 7/14; B62D 7/142; B62D 7/15; B62D 7/1527; B62D 13/00; B62D 13/005; B62D 13/02; B62D 13/04
USPC .............. 180/23, 24; 280/419, 426, 442, 443, 280/444, 445, 656
See application file for complete search history.

(56) References Cited

U.S. PATENT DOCUMENTS

| | | | | |
|---|---|---|---|---|
| 2,818,275 A * | 12/1957 | Hollowell | ...................... | 280/443 |
| 2,848,244 A * | 8/1958 | Georgi | ......................... | 280/81.6 |
| 3,097,863 A * | 7/1963 | Moore | .......................... | 280/445 |
| 3,149,858 A * | 9/1964 | Gilbert | ........................ | 280/442 |
| 3,529,848 A * | 9/1970 | Harvey | .......................... | 280/99 |
| 3,620,549 A * | 11/1971 | Miller et al. | .................... | 280/99 |
| 3,753,580 A * | 8/1973 | Folkert | .......................... | 280/443 |
| 3,899,188 A * | 8/1975 | Curry | .......................... | 280/81.6 |
| 3,993,326 A * | 11/1976 | Schmidt | ........................ | 280/426 |
| 4,405,147 A * | 9/1983 | Horsman et al. | ............ | 280/443 |
| 4,484,758 A * | 11/1984 | Murray et al. | ............... | 280/442 |
| 4,982,976 A * | 1/1991 | Kramer | ........................ | 280/426 |
| 5,340,142 A * | 8/1994 | Kuhns | .......................... | 280/444 |
| 5,477,937 A * | 12/1995 | Chagnon | .................... | 180/24.01 |
| 6,135,484 A * | 10/2000 | Lauronen et al. | ........... | 280/444 |
| 6,176,504 B1 * | 1/2001 | Van Mill et al. | ............. | 280/444 |
| 6,488,114 B1 * | 12/2002 | McMahon et al. | ........... | 180/414 |
| 6,796,572 B1 * | 9/2004 | McGhie | ........................ | 280/426 |
| 7,147,241 B2 * | 12/2006 | Beaujot et al. | ............... | 280/442 |
| 7,571,916 B2 * | 8/2009 | Skiles | .......................... | 280/100 |
| 7,694,993 B2 * | 4/2010 | Timmons, Jr. | ............... | 280/442 |
| 7,810,823 B2 * | 10/2010 | Van Mill et al. | ............. | 280/81.6 |
| 7,926,833 B2 * | 4/2011 | Hellbusch | ...................... | 280/442 |
| 8,419,032 B1 * | 4/2013 | McGhie et al. | ........ | 280/124.157 |
| 2004/0188971 A1 * | 9/2004 | Rudder et al. | ......... | 280/124.111 |
| 2005/0077703 A1 * | 4/2005 | Tango | .......................... | 280/442 |
| 2009/0273159 A1 * | 11/2009 | Sutton | .......................... | 280/419 |
| 2010/0052289 A1 * | 3/2010 | Frey et al. | ..................... | 280/442 |
| 2012/0319380 A1 * | 12/2012 | Chaddock | ................. | 280/476.1 |
| 2013/0049328 A1 * | 2/2013 | Qattan et al. | .................. | 280/426 |
| 2013/0257016 A1 * | 10/2013 | Orgeron | ........................ | 280/442 |

* cited by examiner

*Primary Examiner* — Joseph Rocca
*Assistant Examiner* — Marc A Scharich

(57) ABSTRACT

A steerable trailer provides the ability to offset the center line of the trailer to the tow vehicle with a swivel tongue and pivoting axles. The steerable trailer can alter the turning radius of the trailer and improve the turning and backing of the trailer. Typically, a trailer moves relative to the tow vehicle. The steerable trailer allows a user to control the trailer steering independently from the tow vehicle and adds up to two more points to steer more accurately and safely in close areas, for example. The swiveling tongue and pivoting axles can be used independently or together to position the trailer safely in different radii.

7 Claims, 4 Drawing Sheets

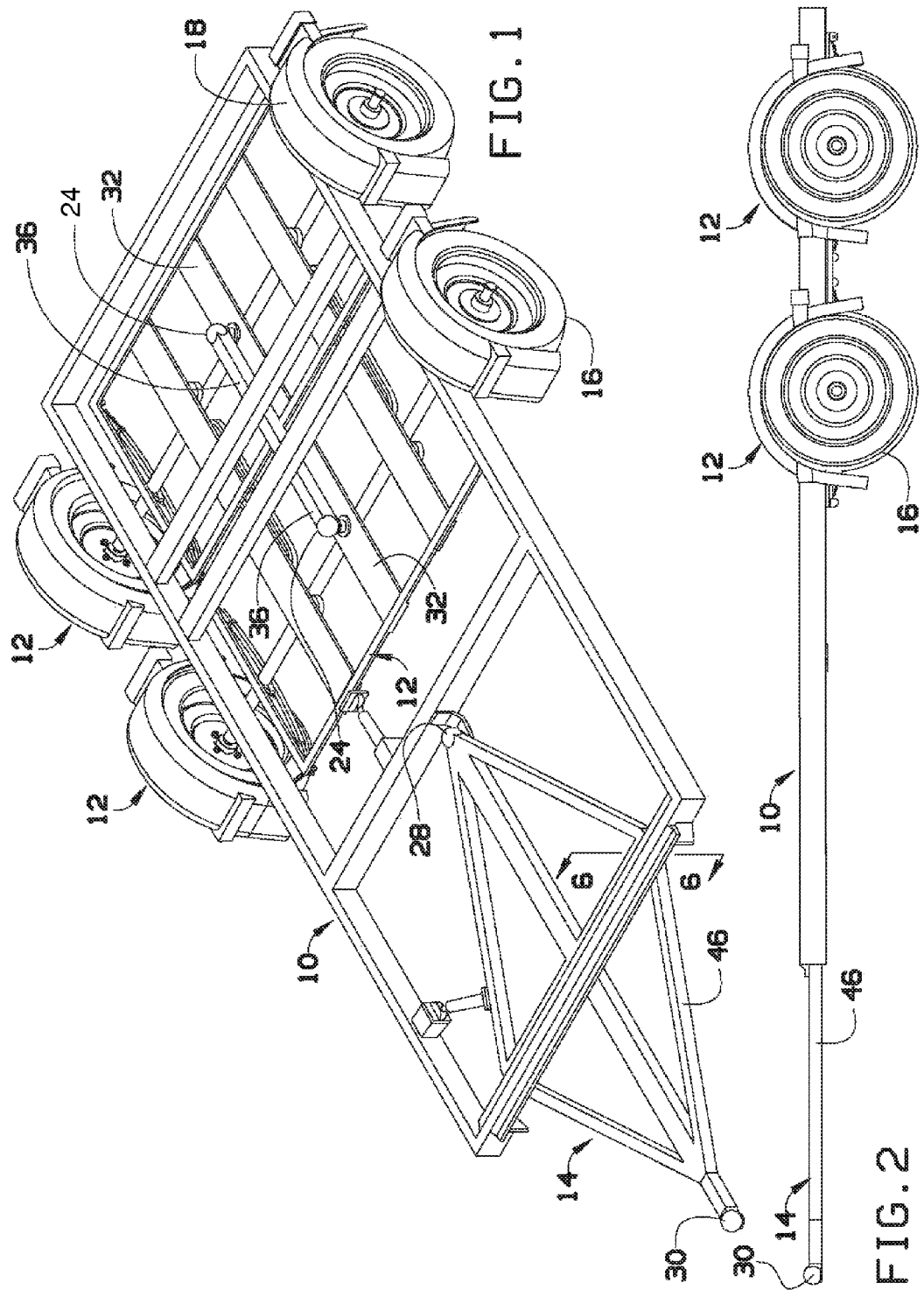

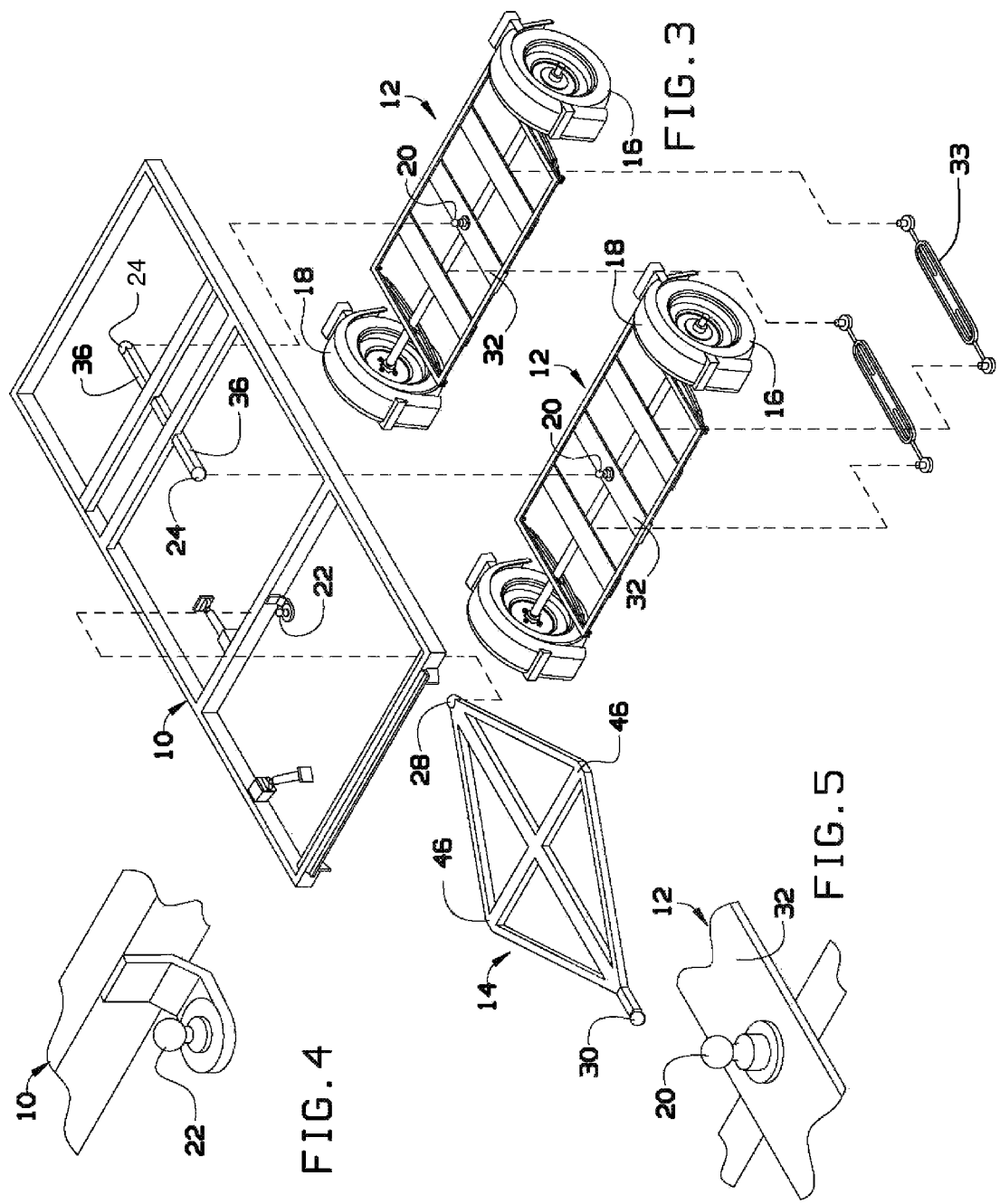

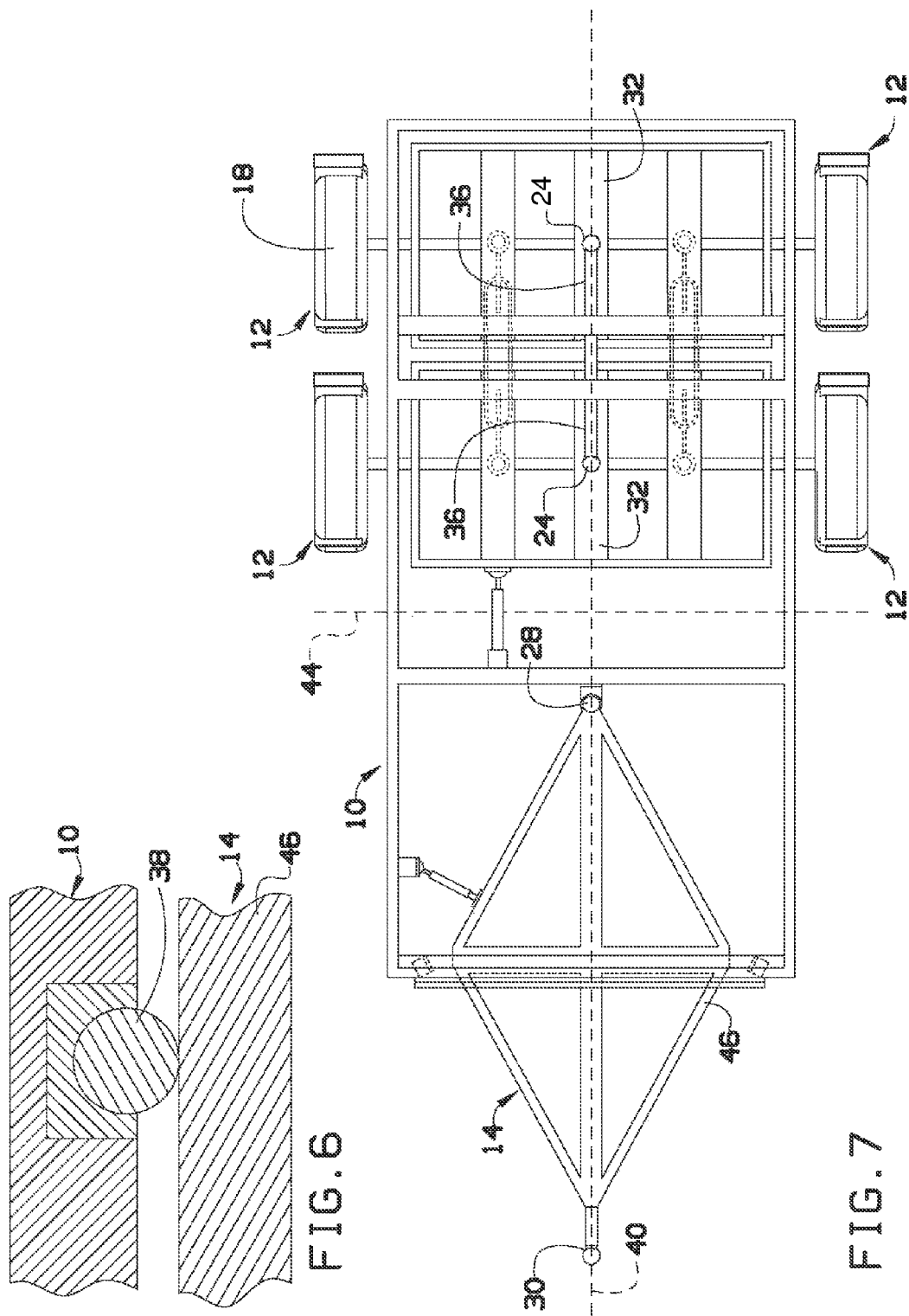

STEERABLE TRAILER CHASSIS

BACKGROUND OF THE INVENTION

The present invention relates to a steerable trailer chassis and, more particularly, to a steerable trailer that can offset the center line of the trailer to the tow vehicle, using a swivel tongue and pivoting axles to alter the turning radius of the trailer to improve the turning and backing.

Conventional trailers do not track in the same radius as the tow vehicle. A regular trailer moves in relationship to the steering of the tow vehicle. This can make the control of the trailer difficult, especially when attempting to position the trailer in a precise location.

As can be seen, there is a need for a trailer that can be steerable to track in the same radius as the tow vehicle.

SUMMARY OF THE INVENTION

In one aspect of the present invention, a steerable trailer comprises a main frame assembly; a main frame receiver bracket attached to the main frame assembly; at least one connector receiver disposed on at least one end of the main frame receiver bracket; at least one wheel frame assembly pivotably attached to the at least one connector receiver with a wheel frame assembly connector; a main frame connector disposed on the main frame, forward of the wheel frame assembly; and a pivot frame assembly pivotably connected to the main frame connector and extending beyond a front end of the main frame assembly.

In another aspect of the present invention, a steerable trailer comprises a main frame assembly; a main frame receiver bracket attached to the main frame assembly; first and second connector receivers disposed on opposite ends of the main frame receiver bracket; first and second wheel frame assemblies pivotably attached to the first and second connector receivers with a wheel frame assembly connector; at least two connectors interconnection the first and second wheel frame assemblies; a main frame connector disposed on the main frame, forward of the wheel frame assemblies; and a pivot frame assembly pivotably connected to the main frame connector and extending beyond a front end of the main frame assembly.

These and other features, aspects and advantages of the present invention will become better understood with reference to the following drawings, description and claims.

BRIEF DESCRIPTION OF THE DRAWINGS

FIG. 1 is a perspective view of a steerable trailer according to an exemplary embodiment of the present invention;

FIG. 2 is a side view of the steerable trailer of FIG. 1;

FIG. 3 is an exploded perspective view of the steerable trailer of FIG. 1;

FIG. 4 is a detailed perspective view of a tow ball and a wheel frame assembly center bar of the steerable trailer of FIG. 1;

FIG. 5 is a detailed perspective view of a main frame tow ball of the steerable trailer of FIG. 1;

FIG. 6 is a cross-sectional view taken along line 6-6 of FIG. 1;

FIG. 7 is a top view of the steerable trailer of FIG. 1; and

DETAILED DESCRIPTION OF THE INVENTION

Figure 8:
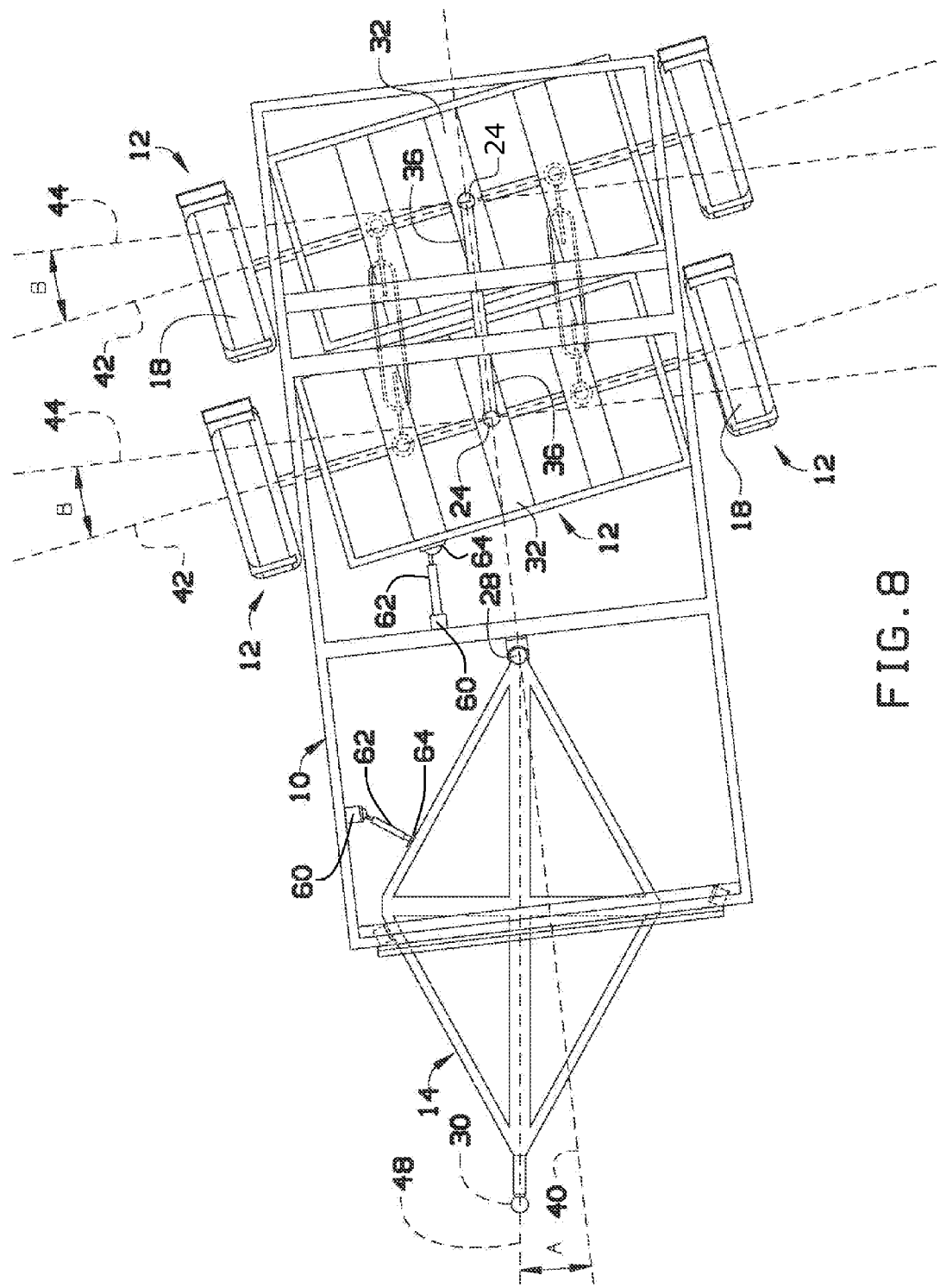
FIG. 8 is a top view of the steerable trailer of FIG. 1, illustrating a non-linear axial configuration.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention relates to a steerable trailer that provides the ability to offset the center line of the trailer to the tow vehicle with a swivel tongue and pivoting axles. The steerable trailer can alter the turning radius of the trailer and improve the turning and backing of the trailer. Typically, a trailer moves relative to the tow vehicle. The steerable trailer allows a user to control the trailer steering independently from the tow vehicle and adds up to two or more points to steer more accurately and safely in close areas, for example. The swiveling tongue and pivoting axles can be used independently or together to position the trailer safely in different radii.

Referring now to FIGS. 1 through 8, a main frame assembly 10 can support one or more wheel frame assemblies 12. For example, as shown in the Figures, two wheel frame assemblies 12 can each have a wheel frame center bar 32 with a wheel frame connector 20, such as a tow ball. The wheel frame connector 20 can fit into a connector receiver 24, such as a tow ball receiver, disposed on opposite ends of a main frame connector receiver bracket 36. The connection of the wheel frame connector 20 into the connector receiver 24 allows the wheel frame assemblies 12 to pivot relative to the main frame assembly 10.

The wheel frame assemblies 12 can be supported by wheels 16, typically covered with fenders 18. The wheel frame assemblies 12 can be interconnected with a plurality of connectors 33. The connectors 33 can be three such connectors interconnecting a forward one of the wheel frame assemblies 12 with a rearward one of the wheel frame assemblies 12 so that movement of one of the wheel frame assemblies 12 moves the other one of the wheel frame assemblies 12.

A main frame connector 22, such as a tow ball, can be attached to the main frame, forward of the wheel frame assemblies 12. A pivot frame assembly 14 can have a pivot frame receiver 28, such as a tow ball receiver, disposed on one end thereof and operable to receive the main frame connector 22 therein. When the main frame connector 22 is disposed in the pivot frame receiver 28, the pivot frame receiver 28 can pivot relative to the main frame assembly 10.

A tow ball receiver 30 can be disposed on an opposite end of the pivot frame assembly 14. The tow ball receiver 30 can attach to a tow ball of a vehicle (not shown). In some embodiments, the pivot frame assembly 14 can be diamond shaped with a pivot frame side bar 46 forming a cross member through the diamond shape. As shown in FIG. 6, a plurality of roller bearings 38 can be disposed on an underside of the main frame assembly 10 to permit the pivot frame assembly to smoothly move along the main frame assembly 10.

One or more actuators 60 can be attached to the main frame assembly 10 having a shaft 62 that can be extended or retracted by the actuators 60. A mount 64 can interconnect the shaft 62 with a portion of one of the wheel frame assemblies 12. When the actuator 60 is activated, the shaft 62 can extend or retract to steer the wheel frame assemblies 12. For example, as shown in FIG. 8, the shaft 62 can be retracted by the actuator 60 to move the wheel frame assemblies 12 to steer the trailer. Similarly, another mount 62 can connect the pivot frame assembly 14 with another shaft 62 attached to another actuator 60. This actuator can move the pivot frame assembly 14 in a desired orientation.

As shown in FIG. 8, the pivot frame assembly 14 can be moved independently (independently of the wheel frame assemblies 12) to an angle A, an angle of pivot between a main frame longitudinal axis 40 and a pivot frame assembly longitudinal axis 48. The wheel frame assemblies 12 can be moved independently (independently of the pivot frame assembly 14) to an angle B, an angle of pivot between an axis 44 perpendicular to the main frame longitudinal axis 40 and a wheel axial axis 42.

The actuators 60 can be controlled independently to position the wheel frame assembly 12 and the pivot frame assembly 14 at desired angles. In some embodiments, adjustment of the actuators 60 can be done from within the tow vehicle. In some embodiments, the actuators 60 can be wired to the inside of the tow vehicle or can be accessed wirelessly, for example. The actuators 60 can be powered from the tow vehicle or can be powered by a battery (not shown) carried by the trailer. This battery can be, for example, solar charged to maintain its power level.

In some embodiments, the actuators 60 can be automatically adjusted. For example, GPS can be used to position the trailer and provide optimal trailer tracking.

It should be understood, of course, that the foregoing relates to exemplary embodiments of the invention and that modifications may be made without departing from the spirit and scope of the invention as set forth in the following claims.

What is claimed is:

1. A steerable trailer comprising:
   a main frame assembly having a longitudinal axis and including longitudinal frame members extending between front and rear ends of the main frame assembly, and further including at least one lateral frame member extending laterally between the longitudinal frame members;
   a main frame receiver bracket attached to the at least one lateral frame member of the main frame assembly;
   at least one connector receiver disposed on the main frame receiver bracket and positioned in alignment with the longitudinal axis of the main frame assembly;
   at least one wheel frame assembly including a wheel frame structure, a wheel frame assembly connector disposed on the wheel frame structure and at least a pair of wheels operably coupled to and supporting the wheel frame structure such that the pair of wheels remain at a constant angular orientation relative to the wheel frame structure, and wherein the wheel frame assembly connector is operably connected to and pivots about the at least one connector receiver;
   a main frame connector disposed on the main frame assembly and positioned in alignment with the longitudinal axis of the main frame assembly forward of the at least one wheel frame assembly; and
   a pivot frame assembly configured to be attached to a tow vehicle, the pivot frame assembly pivotably connected to the main frame connector and extending forwardly beyond the front end of the main frame assembly,
   wherein, at the front end of the main frame assembly, the pivot frame assembly contacts the main frame assembly on a bearing surface of the main frame assembly and is further configured to move laterally on the bearing surface in at least a generally lateral side-to-side direction relative to the main frame assembly, and
   wherein the at least one wheel frame assembly is capable of pivoting relative to the main frame assembly about the at least one connector receiver independently of the pivot frame assembly pivoting and moving in the generally lateral side-to-side direction relative to the main frame assembly.

2. The steerable trailer of claim 1, wherein the at least one connector receiver comprises first and second connector receivers disposed on the main frame receiver bracket.

3. The steerable trailer of claim 2, wherein the at least one wheel frame assembly comprises a forward wheel frame assembly and a rear wheel frame assembly, and wherein the forward wheel frame assembly is pivotably connected to one of the first and second connector receivers and the rear wheel frame assembly is pivotably connected to the other one of the first and second connector receivers.

4. The steerable trailer of claim 3, further comprising two or more connectors which interconnect the forward wheel frame assembly and the rear wheel frame assembly.

5. The steerable trailer of claim 1, wherein the bearing surface comprises a plurality of roller bearings disposed on a bottom side of at least a portion of the main frame assembly, and the pivot frame assembly is configured to move along the plurality of roller bearings.

6. The steerable trailer of claim 1, further comprising an actuator comprising an extendable and retractable shaft operable to pivot the at least one wheel frame assembly relative to the main frame assembly.

7. The steerable trailer of claim 1, further comprising an actuator comprising an extendable and retractable shaft operable to pivot the pivot frame assembly relative to the main frame assembly.

* * * * *